(12) United States Patent
Watanabe

(10) Patent No.: US 10,399,331 B2
(45) Date of Patent: Sep. 3, 2019

(54) INK JET HEAD AND INK JET PRINTER

(71) Applicant: TOSHIBA TEC KABUSHIKI KAISHA, Tokyo (JP)

(72) Inventor: Hiroyuki Watanabe, Ichikawa Chiba (JP)

(73) Assignee: TOSHIBA TEC KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/035,740

(22) Filed: Jul. 16, 2018

(65) Prior Publication Data

US 2019/0023006 A1 Jan. 24, 2019

(30) Foreign Application Priority Data

Jul. 21, 2017 (JP) ................. 2017-142022

(51) Int. Cl.
*B41J 2/045* (2006.01)
*G06K 15/02* (2006.01)
*B41J 2/14* (2006.01)

(52) U.S. Cl.
CPC ....... *B41J 2/04541* (2013.01); *B41J 2/04573* (2013.01); *B41J 2/04581* (2013.01); *B41J 2/04588* (2013.01); *B41J 2/04591* (2013.01); *B41J 2/1433* (2013.01); *G06K 15/02* (2013.01); *B41J 2202/06* (2013.01); *B41J 2202/10* (2013.01); *B41J 2202/13* (2013.01)

(58) Field of Classification Search
CPC .......................... B41J 2/04541; B41J 2/04581; B41J 2/04588; B41J 2/04591; B41J 2/04573
USPC .................................. 347/9–11, 68
See application file for complete search history.

(56) References Cited

U.S. PATENT DOCUMENTS 8,172,352 B2 * 5/2012 Okada ............... B41J 2/04505
347/10
8,752,925 B2 * 6/2014 Norigoe ............ B41J 2/04588
347/10
9,427,956 B2 8/2016 Nitta et al.

FOREIGN PATENT DOCUMENTS

JP 2011-056760 A 3/2011
JP 2014-148110 A 8/2014
JP 2014-208411 A 11/2014

OTHER PUBLICATIONS

U.S. Appl. No. 15/893,338, filed Feb. 9, 2018 (First Inventor: Hiroyuki Watanabe).

* cited by examiner

*Primary Examiner* — An H Do
(74) *Attorney, Agent, or Firm* — Kim & Stewart LLP

(57) ABSTRACT

An ink jet head includes a pressure chamber, a nozzle plate including a nozzle, an actuator configured to cause an ink to be discharged from the pressure chamber via the nozzle, and a drive circuit configured to supply to the actuator an expansion signal, having a pulse width equal to a natural vibration cycle of the ink in the pressure chamber, that expands the pressure chamber to an expanded state from an initial state, a release signal, having a pulse width longer than the natural vibration cycle and shorter than three times the natural vibration cycle, that returns the pressure chamber to the initial state from the expanded state, and a contraction signal, having a pulse width longer than the natural vibration cycle and shorter than three times the natural vibration cycle, that contracts the pressure chamber to a contracted state from the initial state.

20 Claims, 9 Drawing Sheets

FIG. 8
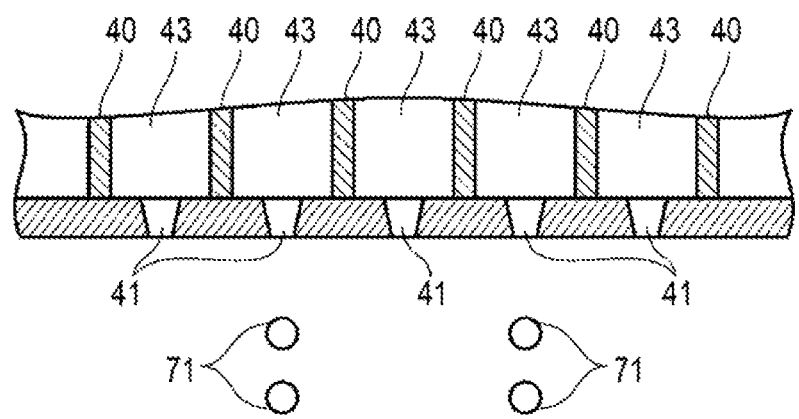
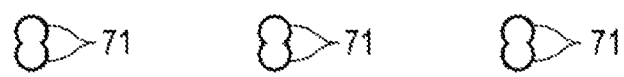

INK JET HEAD AND INK JET PRINTER

CROSS-REFERENCE TO RELATED APPLICATION

This application is based upon and claims the benefit of priority from Japanese Patent Application No. 2017-142022, filed Jul. 21, 2017, the entire contents of which are incorporated herein by reference.

FIELD

Embodiments described herein relate generally to an ink jet head and an ink jet printer.

BACKGROUND

An ink jet printer forms an image on a print medium according to print data. The ink jet printer includes an ink jet head and a head controller that controls the ink jet head. The inkjet head includes an actuator that ejects ink for image printing and a drive IC that drives the actuator according to control of the head controller.

DESCRIPTION OF THE DRAWINGS

FIG. 8 depicts an example of a flight state of ink droplets ejected from an ejecting nozzle.

DETAILED DESCRIPTION

In general, according to one embodiment, an ink jet head includes a nozzle plate including a nozzle, an actuator associated with a pressure chamber and configured to cause an ink to be discharged from the pressure chamber via the nozzle, and a drive circuit configured to supply to the actuator in a droplet ejection process: an expansion signal that expands the pressure chamber to an expanded state from an initial state, a release signal that returns the pressure chamber to the initial state from the expanded state, and a contraction signal that contracts the pressure chamber to a contracted state from the initial state. The expansion signal has a first pulse width equal to a natural vibration cycle of the ink in the pressure chamber, the release signal has a second pulse width longer than the natural vibration cycle and shorter than three times the natural vibration cycle, and the contraction signal has a third pulse width longer than the natural vibration cycle and shorter than three times the natural vibration cycle.

Figure 1:
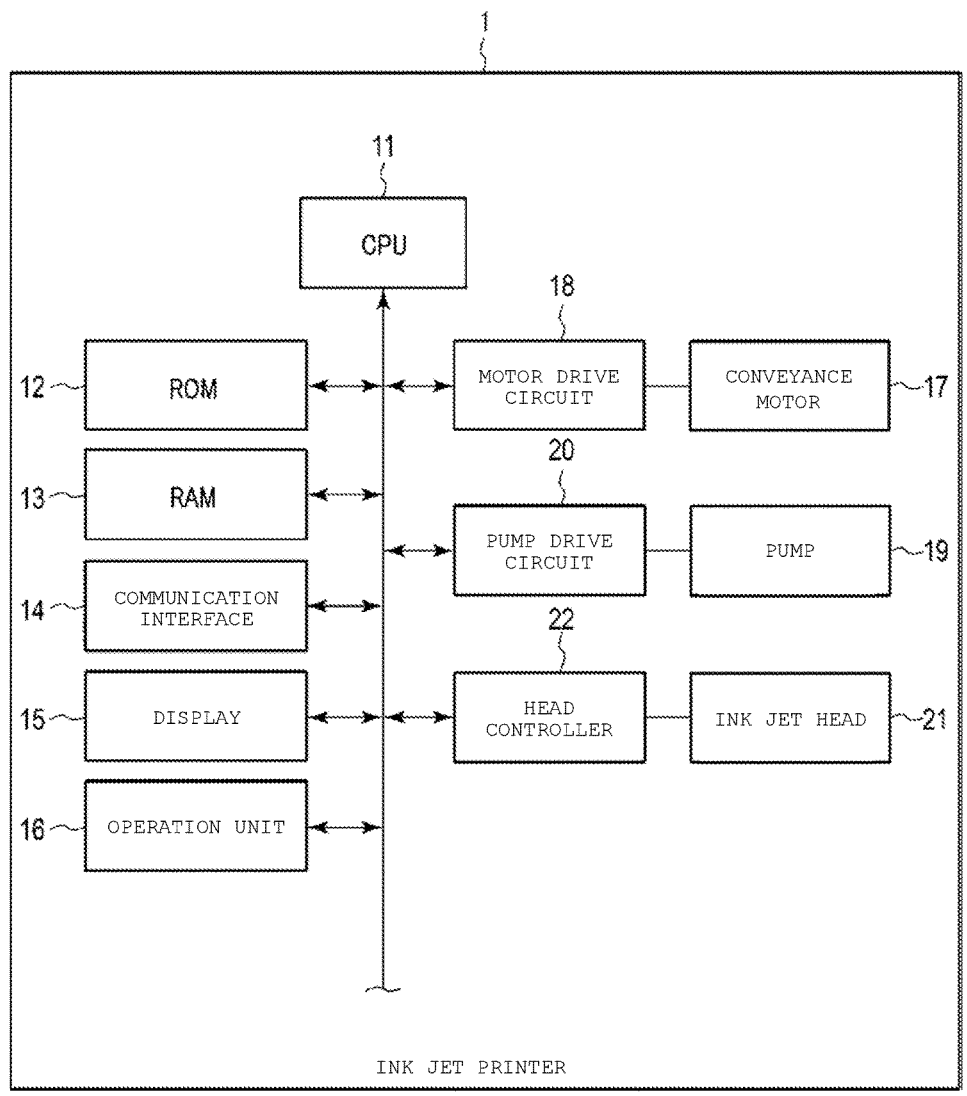
FIG. 1 is an explanatory view of an ink jet printer according to one embodiment.

Hereinafter, an ink jet printer and an ink jet head according to example embodiments will be described with reference to the drawings. First, an ink jet printer 1 according to one embodiment will be described. FIG. 1 is an explanatory view of the ink jet printer 1 according to one embodiment.

It should be noted that the ink jet printer 1 explained below is one example of ink jet recording apparatuses according to the present disclosure and does not limit the possible configurations, specifications, or the like of ink jet recording apparatuses according to the present disclosure. For example, other apparatuses such as a copying machine may be used.

The ink jet printer 1 performs, for example, various processes such as image formation while conveying a print medium that is a recording medium. The ink jet printer 1 includes a Central Processing Unit (CPU) 11, a Read Only Memory (ROM) 12, a Random Access Memory (RAM) 13, a communication interface 14, a display 15, an operation unit 16, a conveyance motor 17, a motor drive circuit 18, a pump 19, a pump drive circuit 20, an ink jet head 21, and a head controller 22. Furthermore, the ink jet printer 1 includes a paper feeding cassette and a paper discharge tray which are not illustrated.

The CPU 11 is an arithmetic element (for example, a processor) that executes arithmetic processing. The CPU 11 performs various processes based on data such as programs stored in the ROM 12. The CPU 11 functions as a control unit capable of executing various operations by executing programs stored in the ROM 12.

The ROM 12 is a read-only nonvolatile memory. The ROM 12 temporarily stores programs, data used in the programs, and the like.

The RAM 13 is a volatile memory functioning as a working memory. The RAM 13 temporarily stores data under processing of the CPU 11 and the like. The RAM 13 temporarily stores a program executed by the CPU 11.

The communication interface 14 is an interface for communicating with other devices. The communication interface 14 is used, for example, for communicating with an external device that transmits print data to the ink jet printer 1. The communication interface 14 may perform wireless communication with other devices according to standards such as Bluetooth® or Wi-Fi®.

The display 15 is a display device that displays a screen according to a video signal input from the CPU 11 or a display control unit such as a graphic controller (not particularly depicted). For example, a setting screen of the ink jet printer 1 is displayed on the display 15.

The operation unit 16 generates an operation signal based on an operation. The operation unit 16 is, for example, a touch sensor, a numerical key, a power key, a paper feeding key, various function keys, a keyboard, or the like. The touch sensor is, for example, a resistive touch sensor, a capacitive touch sensor, or the like. The touch sensor acquires information indicating a position designated within a certain region. The touch sensor is integrated with the display 15 as a touch panel, thereby generating a signal indicating a position touched on a screen displayed on the display 15.

The conveyance motor 17 rotates to operate a conveyance member on a conveyance path (not particularly depicted) for conveying the print medium. The conveyance member is a belt, a roller, a guide, or the like for conveying the print medium. The conveyance motor 17 conveys the print medium along a guide by driving a roller that operates in conjunction with a belt holding the print medium.

The motor drive circuit 18 is a circuit for driving the conveyance motor 17. The motor drive circuit 18 drives the conveyance motor 17 in accordance with a conveyance control signal input from the CPU 11 to convey the print medium of the paper feeding cassette to the paper discharge tray via the ink jet head 21. The paper feeding cassette is a cassette that accommodates a plurality of the print media. The paper discharge tray accommodates the print medium on which an image is formed by the ink jet printer 1 and which is discharged.

The pump 19 includes, for example, an ink tank (not particularly depicted) in which the ink is held, and a tube communicating with the ink jet head 21. Specifically, the tube communicates with a common ink chamber (not particularly depicted) of the ink jet head 21.

The pump drive circuit 20 drives the pump 19 according to an ink supply control signal input from the CPU 11 to supply the ink in the ink tank to the common ink chamber of the ink jet head 21.

The ink jet head 21 is an image forming unit that forms an image on the print medium. The ink jet head 21 ejects the ink with respect to the print medium held by a holding roller (not particularly depicted) to form an image on the print medium. The ink jet printer 1 may include, for example, a plurality of the ink jet heads 21 corresponding to respective colors such as cyan, magenta, yellow, and black.

The head controller 22 is a circuit for controlling the ink jet head 21. The head controller 22 operates the ink jet head 21 to eject the ink from the ink jet head 21. The head controller 22 inputs print data, a clock signal, and a reset signal input from the CPU 11, and a DC power for operating the ink jet head 21 into the ink jet head 21. Therefore, the head controller 22 causes the ink jet head 21 to form an image corresponding to the print data on the print medium.

The ink jet printer 1 further includes a power supply circuit for converting an AC power supplied from a commercial power supply into a DC power and supplying the DC power to each configuration in the ink jet printer 1.

Figure 2:
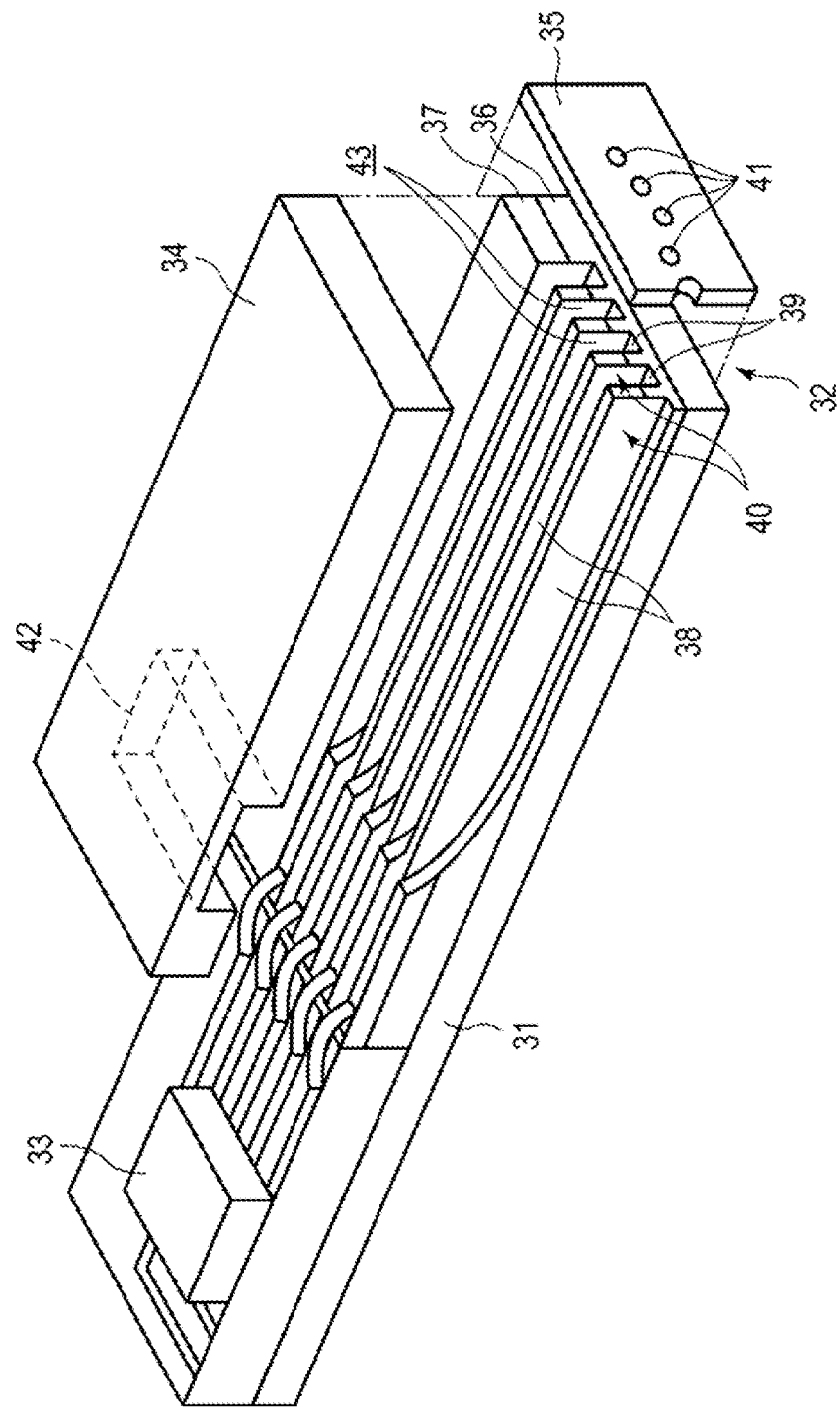
FIG. 2 depicts an ink jet head according to one embodiment.
Figure 3:
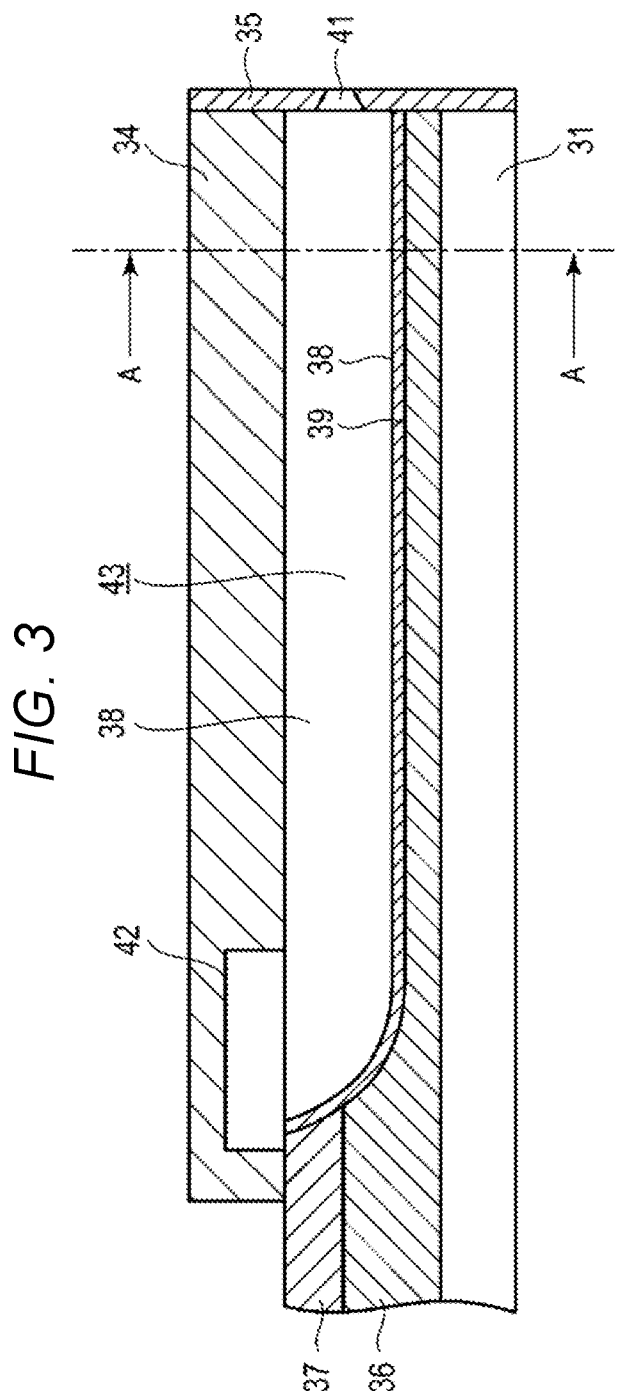
FIG. 3 is a cross-sectional view of one channel of an ink jet head according to one embodiment.
Figure 4:
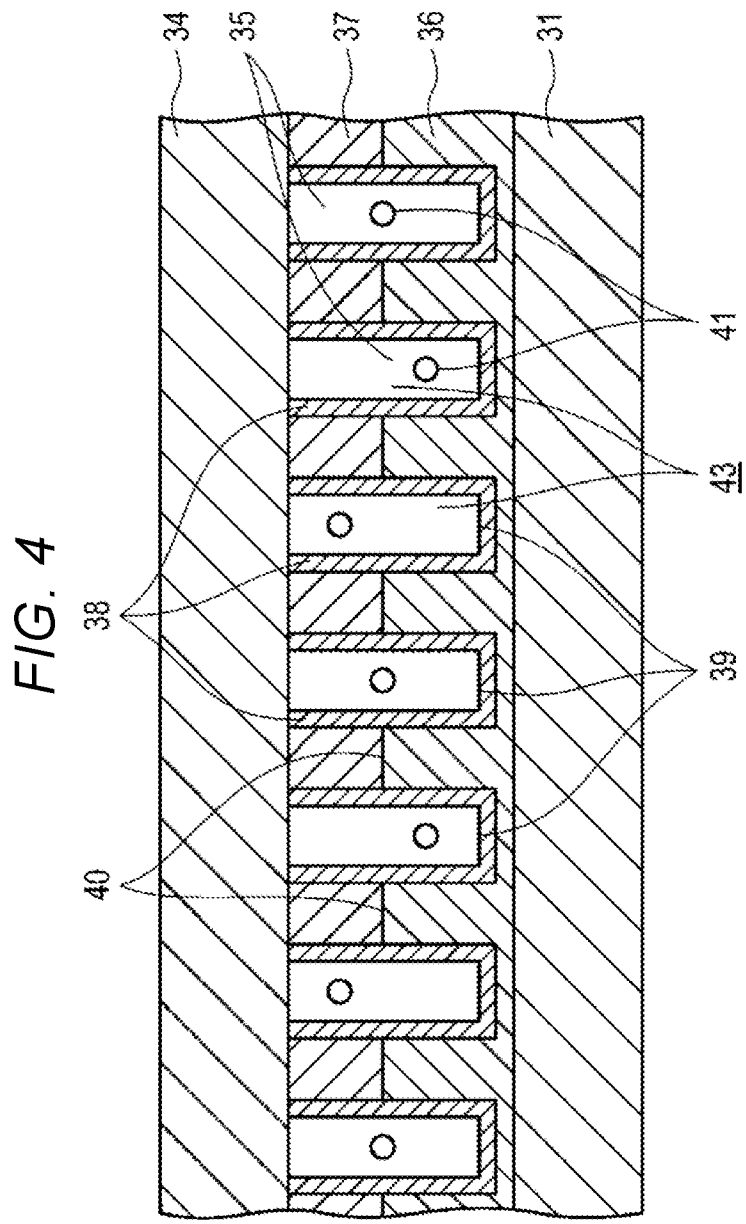
FIG. 4 is a cross-sectional view of the ink jet head, which is taken along line A-A depicted in FIG. 3.

FIGS. 2 to 4 illustrate configuration examples of the ink jet head 21. FIG. 2 is a perspective view a part of the inkjet head 21. FIG. 3 is a cross-sectional view of one channel of the ink jet head 21. FIG. 4 is a cross-sectional view of the ink jet head 21, which is taken along line A-A depicted in FIG. 3.

The ink jet head 21 includes a head substrate 31, a channel group 32, and a drive IC 33. In FIG. 2, a top plate 34 and a nozzle plate 35 of the channel group 32 are disassembled and illustrated.

The head substrate 31 is a substrate on which the channel group 32 and the drive IC 33 are mounted. The head substrate 31 is formed of a glass/epoxy substrate or a flexible substrate with a polyimide film as a base material.

The channel group 32 is formed by arranging a plurality of channels for ejecting the ink in accordance with an applied voltage. The channel group 32 includes a first piezoelectric member 36 bonded to the head substrate 31, a second piezoelectric member 37 bonded to the first piezoelectric member 36, a plurality of electrodes 38, the top plate 34, and the nozzle plate 35.

The first piezoelectric member 36 and the second piezoelectric member 37 contain, for example, lead zirconate titanate (PZT). The first piezoelectric member 36 is bonded to the head substrate 31. The second piezoelectric member 37 is bonded to the first piezoelectric member 36 so that a polarization direction thereof faces that of the first piezoelectric member 36. A plurality of parallel grooves 39 extending from a second piezoelectric member 37 side to the first piezoelectric member 36 is formed in the first piezoelectric member 36 and the second piezoelectric member 37 which are bonded to each other.

The electrodes 38 are formed over a pair of walls and bottom surfaces including the grooves 39 of the first piezoelectric member 36 and the second piezoelectric member 37. The electrode 38 is formed for each groove 39. Therefore, the first piezoelectric member 36 and the second piezoelectric member 37 forming a wall of the groove 39 are sandwiched by different electrodes 38. The first piezoelectric member 36 and the second piezoelectric member 37 sandwiched by two electrodes 38 are formed as an actuator 40 that is deformed by a potential difference between the two electrodes 38.

The nozzle plate 35 is a member for sealing the groove 39 together with the top plate 34. The nozzle plate 35 is formed so as to close an end portion of the groove 39 in a longitudinal direction. A plurality of ejecting nozzles 41 causing the grooves 39 to communicate with an outside of the ink jet head 21 is formed in the nozzle plates 35. The ejecting nozzle 41 is formed for each groove 39.

The top plate 34 is a member for sealing the grooves 39 together with the nozzle plates 35. The top plate 34 seals the grooves 39 from a side facing the head substrate 31. The top plate 34 is formed such that a part of a surface being in contact with the groove 39 is formed as a recessed portion 42. The recessed portion 42 functions as the common ink chamber that communicates with the tube of the pump 19 and temporarily holds the ink supplied by the tube. The recessed portion 42 communicates with an end portion of the groove 39 on a side opposite to the end portion being in contact with the nozzle plate 35, and supplies the ink in the common ink chamber to the groove 39.

The plurality of the grooves 39 is sealed by the nozzle plate 35 and the top plate 34 so that a pressure chamber 43 is formed. That is, the pressure chamber 43 is a space surrounded by a pair of actuators 40, the nozzle plate 35, and the top plate 34, and communicating with the common ink chamber. The pressure chamber 43 is formed for each ejecting nozzle 41 formed in the nozzle plate 35. In the example embodiment described herein, a combination of the electrode 38 of the pressure chamber 43 and the ejecting nozzle 41 is referred to as a channel. That is, the channel group 32 includes channels corresponding to the number of the grooves 39.

The drive IC 33 inputs a signal into the actuator 40 forming a wall of the pressure chamber 43 to deform the actuator 40 and change a volume of the pressure chamber 43. Therefore, the drive IC 33 controls the pressure of the pressure chamber 43 to eject the ink in the pressure chamber 43 from the ejecting nozzle 41.

Figure 5A:
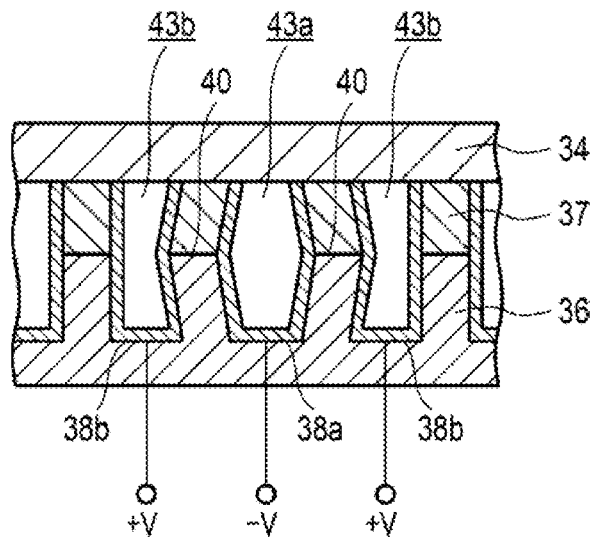
FIGS. 5A and 5B depict a modification example of an actuator of an ink jet head according to one embodiment.
Figure 5B:
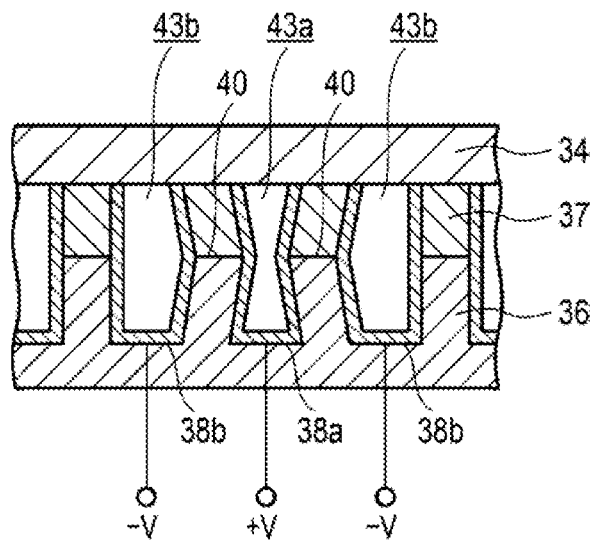

FIGS. 5A and 5B are an explanatory view of a modification example of an actuator 40 in a case where the potential difference is generated in electrodes sandwiching an actuator 40. In a case where the potential difference is not generated between two electrodes 38 sandwiching the actuator 40, the actuator 40 is not deformed as depicted in FIG. 4. A state of a volume of the pressure chamber 43 in a case where the actuator 40 is not deformed is referred to as an initial state or a normal state.

FIG. 5A illustrates an example in which a potential of an electrode 38a of a pressure chamber 43a in a certain channel is −V and a potential of an electrode 38b of the pressure chamber 43b of an adjacent channel is +V. In this case, as illustrated in FIG. 5A, an electric field two times a voltage V is generated in the first piezoelectric member 36 and the second piezoelectric member 37 of the actuator 40 sandwiched by the electrode 38a and the electrode 38b in a direction orthogonal to a polarization direction. The actuator 40 expands the volume of the pressure chamber 43a from the initial state to an expanded state and decreases the pressure of the pressure chamber 43a by the electric field.

FIG. 5B illustrates an example in which the potential of the electrode 38a of the pressure chamber 43a in a certain channel is +V and the potential of the electrode 38b of the pressure chamber 43b in the adjacent channel is −V. In this case, as illustrated in FIG. 5B, an electric field two times the voltage V is generated in the first piezoelectric member 36 and the second piezoelectric member 37 of the actuator 40 sandwiched by the electrode 38a and the electrode 38b in the direction orthogonal to the polarization direction and opposite to the polarization direction in FIG. 5A. The actuator 40 contracts the volume of the pressure chamber 43a from the initial state to a contracted state and increases the pressure of the pressure chamber 43 by the electric field.

As described above, in the pressure chamber 43, the actuator 40 forming the wall is deformed, and the volume thereof is switched to the initial state, the expanded state, and the contracted state, so that the pressure thereof is changed. When the pressure of the pressure chamber 43 decreases, the ink is drawn out from the common ink chamber into the pressure chamber 43. When the pressure of the pressure chamber 43 increases, the ink in the pressure chamber 43 is ejected from the ejecting nozzle 41.

As described above, the pressure chamber 43 in a certain channel shares the actuator 40 with the pressure chamber 43 in the adjacent channel. Therefore, the drive IC 33 controls the pressure of the pressure chamber 43 for each group for each n (n is an integer of 2 or more) channels without controlling the pressure of the pressure chamber 43 for each channel. In FIGS. 5A and 5B described above, the pressure of the pressure chamber 43 is controlled with three channels as one group.

The pressure chamber 43 has a natural Acoustic Length (AL) that is determined according to a size of a space, a characteristic of a material included in the ink, a characteristic of a material included in the pressure chamber 43, or the like. That is, the AL indicates a natural vibration cycle of the pressure chamber 43.

Figure 6:
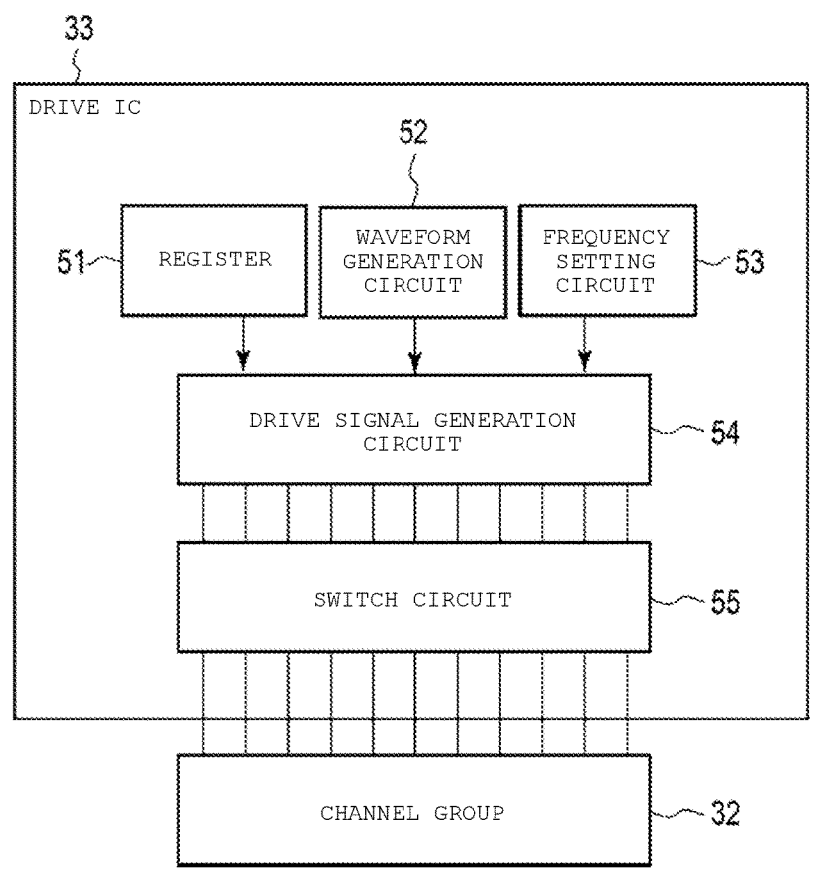
FIG. 6 depicts a drive IC of an ink jet head according to one embodiment.

FIG. 6 is an explanatory view for explaining a configuration example of the drive IC 33. The drive IC 33 switches the potential of each electrode 38 of the channel group 32 based on the control of the head controller 22 to deform the channel group 32. A plurality of output terminals for outputting driving signals of the drive IC 33 is connected to the electrodes 38 of each channel of each channel group 32.

The drive IC 33 includes a register 51, a waveform generation circuit 52, a frequency setting circuit 53, a drive signal generation circuit 54, and a switch circuit 55.

The register 51 temporarily stores print data input from the head controller 22. The register 51 supplies the stored print data to the drive signal generation circuit 54 in the order of storage. The register 51 is, for example, a First-In, First-Out (FIFO) register.

The waveform generation circuit 52 generates a waveform and supplies the waveform to the drive signal generation circuit 54. The waveform generation circuit 52 generates various waveforms using an expansion signal for setting the volume of the pressure chamber 43 to the expanded state, a release signal for setting the volume of the pressure chamber 43 to the initial state, and a contraction signal for setting the volume of the pressure chamber 43 to the contracted state. That is, the expansion signal is a waveform pattern for setting the pressure chamber 43 to the state depicted in FIG. 5A. The release signal is a waveform pattern for setting the pressure chamber 43 to the state depicted in FIG. 4. The contraction signal is a waveform pattern for setting the pressure chamber 43 to the state depicted in FIG. 5B.

The frequency setting circuit 53 sets a driving frequency of the ink jet head 21. The driving frequency is a frequency of a drive signal generated by the drive signal generation circuit 54.

The drive signal generation circuit 54 generates the drive signal for each channel based on print data supplied from the register 51, a signal supplied from the waveform generation circuit 52, and a drive frequency set by the frequency setting circuit 53. The drive signal generation circuit 54 supplies the generated drive signal to the switch circuit 55.

The switch circuit 55 switches a voltage applied to the electrodes 38 of each channel based on the drive signal for each channel supplied from the drive signal generation circuit 54.

As described above, the drive IC 33 switches the voltage applied to the electrode 38 of each channel to change a drive voltage applied to the actuator 40 forming the wall of the pressure chamber 43 of the channel. Therefore, the drive IC 33 deforms the actuator 40 and changes the volume of the pressure chamber 43. The drive IC 33 expands the volume in the pressure chamber 43 to draw the ink from the common ink chamber into the pressure chamber 43. The drive IC 33 contracts the volume in the pressure chamber 43 to eject the ink of the pressure chamber 43 from the ejecting nozzle 41.

Specifically, the drive IC 33 applies the expanded signal to the actuator 40, so that the actuator 40 is deformed and the volume in the pressure chamber 43 is expanded from the initial state to the expanded state. The drive IC 33 applies the release signal to the actuator 40, so that the actuator 40 is deformed and the volume in the pressure chamber 43 is contracted from the expanded state to the initial state. The drive IC 33 applies the contraction signal to the actuator 40, so that the actuator 40 is deformed and the volume in the pressure chamber 43 is contracted from the initial state to the contracted state.

Figure 7:
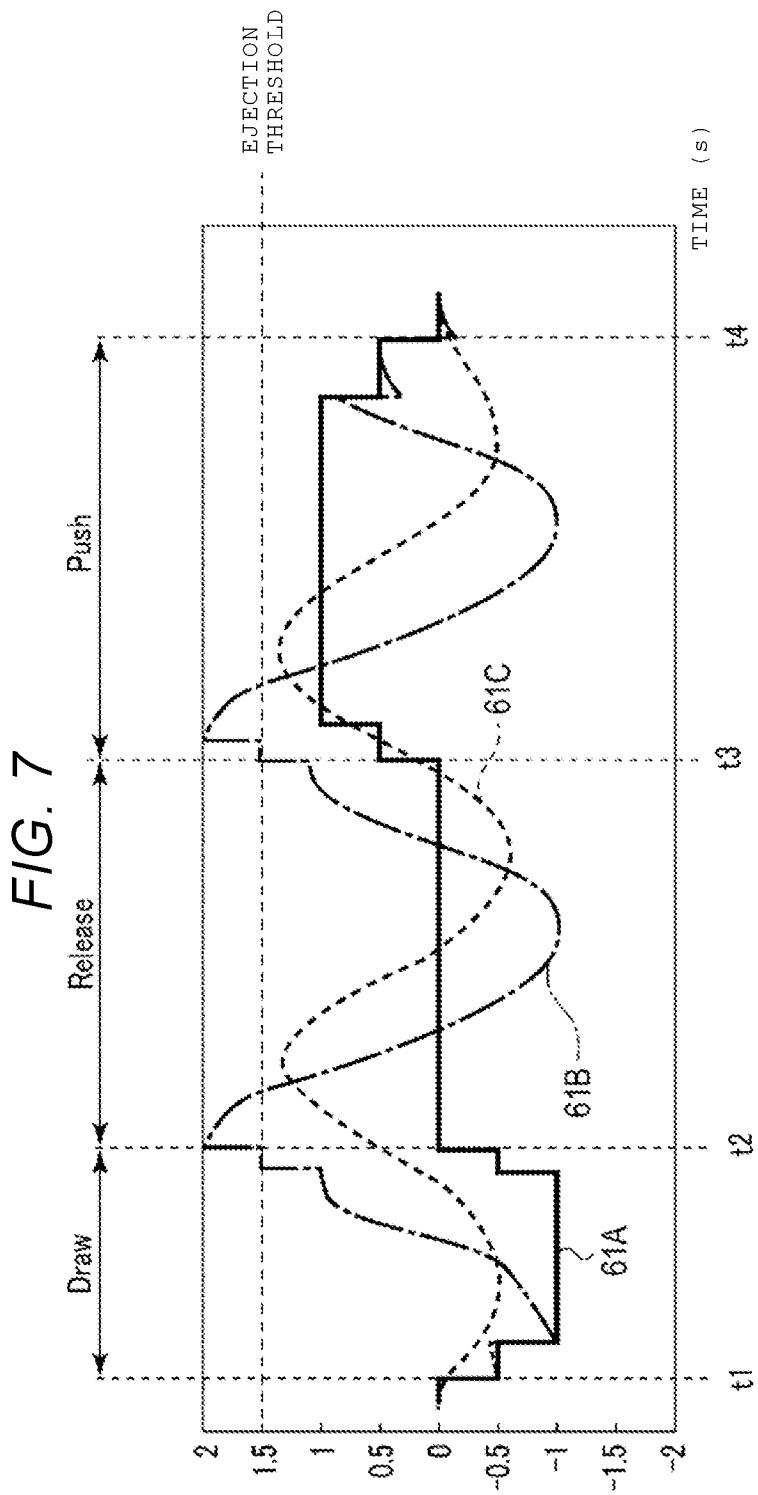
FIG. 7 depicts aspects related to a change in a potential difference generating in an actuator, a change in a pressure in a pressure chamber, and a change in a speed of a meniscus surface formed in an ejecting nozzle.

Next, control of the actuator 40 by the drive IC 33 will be described. FIG. 7 is an explanatory view for explaining a change in a potential difference generating in the actuator 40, a change in a pressure in the pressure chamber 43, and a change in a speed of a meniscus surface formed in the ejecting nozzle 41.

A horizontal axis depicted in FIG. 7 indicates a time. A graph 61A indicates a potential difference generated in the actuator 40. In the graph 61A, a voltage for driving the actuator 40 in a direction in which the volume of the pressure chamber 43 is expanded from the initial state is a negative voltage and a voltage for driving the actuator 40 in a direction in which the volume of the pressure chamber 43 is contracted from the initial state is a positive voltage. In the graph 61A, a voltage for maintaining the volume of the pressure chamber 43 in the initial state is "0 [V]". A graph 61B indicates a pressure in the pressure chamber 43. A graph 61C indicates a change in a speed of the meniscus surface formed in the ejecting nozzle 41.

The drive IC 33 combines the expansion signal, the release signal, and the contraction signal to drive the actuator 40. A period during which the expansion signal is applied to the actuator 40 is referred to as Draw. A period during which the release signal is applied to the actuator 40 is referred to as Release. A period during which the contraction signal is applied to the actuator 40 is referred to as Push. In this context, Draw (or Draw period) refers to a period during which the volume of the pressure chamber 43 is in the expanded state; Release (or Release period) refers to a period during which the volume of the pressure chamber 43 is in its initial, unaltered state; and Push (or Push period) refers to a period during which the volume of the pressure chamber 43 is in the contracted state.

The drive IC 33 changes the state of the volume of the pressure chamber 43 in the following order: Draw, Release, and Push. This sequence combination of Draw, Release, and Push is referred to as a single driving or one driving event. The drive IC 33 ejects a plurality of ink droplets from the ejecting nozzle 41 during one driving event. In the example embodiment described herein, the drive IC 33 is described to eject two droplets of the ink droplets from the ejecting nozzle 41 during a single driving.

As illustrated in FIG. 7, first, the drive IC 33 applies a negative voltage to the actuator 40 from a time t1 to a time t2. In FIG. 7, the negative voltage is a voltage for driving the actuator 40 in a direction in which the pressure chamber 43 is expanded. That is, the drive IC 33 applies the expansion signal to the actuator 40 from the time t1 to the time t2.

The expansion signal is applied to the actuator 40 from the time t1 to the time t2 so that an interval from the time t1 to the time t2 becomes Draw. A length D of the Draw period is a length corresponding to a natural vibration cycle AL of the pressure chamber 43. For example, the length D of the Draw period is a length substantially equal to the natural vibration cycle AL of the pressure chamber 43. The drive IC 33 may expand the pressure chamber 43 in stages in the Draw period. That is, the drive IC 33 may control so that a value of the negative voltage is changed in stages to a voltage corresponding to the expansion signal in the Draw period.

According to the example embodiments described above, as illustrated by the graph 61B, at the time t1, the pressure of the pressure chamber 43 is decreased since the volume of the pressure chamber 43 is expanded from the initial state to the expanded state. Furthermore, the expansion signal is applied to the actuator 40 with the length D substantially equal to the natural vibration cycle AL of the pressure chamber 43, so that the volume of the pressure chamber 43 is maintained in the expanded state until the time t2. Therefore, the pressure of the pressure chamber 43 once decreases and then increases again until the time t2 and exceeds the pressure (referred to as the initial pressure) of the pressure chamber 43 in the initial state.

Next, the drive IC 33 maintains the actuator 40 so that the potential difference becomes 0 V from the time t2 to a time t3. In a case where the potential difference of the actuator 40 is 0 V, a shape of the actuator 40 returns to an original shape. That is, the drive IC 33 applies the release signal to the actuator 40 from the time t2 to the time t3.

The release signal is applied to the actuator 40 from the time t2 to the time t3, so that a period from the time t2 to the time t3 becomes Release. A length R of the Release period is a length corresponding to the natural vibration cycle AL of the pressure chamber 43. For example, the length R of the Release period is a length satisfying a relationship of AL<R<3AL. More specifically, the length R of the Release period is equal to 2AL.

According to the example embodiments described above, as indicated by the graph 61B, at the time t2 at which the pressure of the pressure chamber 43 is the initial pressure or more, since the volume of the pressure chamber 43 is contracted from the expanded state to the initial state, the pressure of the pressure chamber 43 is further increased. In a case where the pressure of the pressure chamber 43 exceeds an ejection threshold determined by a characteristic of the ink, a diameter and a shape of the ejecting nozzle 41, the ink droplets are ejected from the ejecting nozzle 41. In FIG. 7, as indicated by the graph 61C, at the time t2, the pressure of the pressure chamber 43 exceeds the ejection threshold, a displacement of the meniscus surface is increased, and the ink droplets are ejected from the ejecting nozzle 41.

Furthermore, the release signal is applied to the actuator 40 with the length R which is two times the natural vibration cycle AL of the pressure chamber 43. Therefore, the volume of the pressure chamber 43 is maintained in the initial state until the time t3. Therefore, the pressure of the pressure chamber 43 once decreases and then increases again until the time t3, and exceeds the initial pressure.

Next, the drive IC 33 applies a positive voltage to the actuator 40 from the time t3 to a time t4. In FIG. 7, the positive voltage is a voltage for driving the actuator 40 in a direction in which the pressure chamber 43 is contracted. That is, the drive IC 33 applies the contraction signal to the actuator 40 from the time t3 to the time t4.

The contraction signal is applied to the actuator 40 from the time t3 to the time t4, so that a period from the time t3 to the time t4 becomes Push. A length P of the Push period is a length corresponding to the natural vibration cycle AL of the pressure chamber 43. For example, the length P of the Push period is a length satisfying a relationship of AL<P<3AL. More specifically, the length P of the Push period is equal to 2AL. The drive IC 33 may contract the pressure chamber 43 in stages in the Push period. That is, the drive IC 33 may control so that a value of the positive voltage is changed in stages to a voltage corresponding to the contraction signal in the Push period.

According to the example embodiments described above, as indicated by the graph 61B, at the time t3 at which the pressure of the pressure chamber 43 is the initial pressure or more, since the volume of the pressure chamber 43 is contracted from the initial state to the contracted state, the pressure of the pressure chamber 43 is further increased. In a case where the pressure of the pressure chamber 43 exceeds the ejection threshold determined by the characteristic of the ink, the diameter and the shape of the ejecting nozzle 41, the ink droplets are ejected from the ejecting nozzle 41. In FIG. 7, as indicated by the graph 61C, at the time t3, the pressure of the pressure chamber 43 exceeds the ejection threshold, the displacement of the meniscus surface is increased, and the ink droplets are ejected from the ejecting nozzle 41.

Furthermore, the contraction signal is applied to the actuator 40 with the length P which is two times the natural vibration cycle AL of the pressure chamber 43. Therefore, the volume of the pressure chamber 43 is maintained in the contracted state until the time t4. Therefore, the pressure of the pressure chamber 43 once decreases and then increases again until the time t4.

Furthermore, as indicated by the graph 61B, at the time t4, the drive IC 33 controls so that the potential difference of the actuator 40 becomes 0. Therefore, at the time t4 at which the pressure of the pressure chamber 43 is the initial pressure or more, the volume of the pressure chamber 43 is expanded from the contracted state to the initial state. As a result, the pressure of the pressure chamber 43 that is the initial pressure or more is canceled by the expansion of the volume of the pressure chamber 43 and a pressure vibration in the pressure chamber 43 is prevented.

FIG. 8 is a view of an example of a flight state of ink droplets 71 ejected from the ejecting nozzle 41. As illustrated in FIG. 8, two ink droplets 71 are ejected by one driving event. The ejected two ink droplets 71 are combined until they land, and become individual ink droplet 72 to land on the print medium.

As described above, the drive IC 33 contracts the volume of the pressure chamber 43 to be switched from Draw to Release during draw and at timing at which the pressure of the pressure chamber 43 is the initial pressure or more, in one driving event in which Draw, Release, and Push are combined. Therefore, the drive IC 33 increases the pressure of the pressure chamber 43 and ejects the ink droplets from the ejecting nozzle 41. The drive IC 33 further contracts the volume of the pressure chamber 43 and switches the volume from. Release to Push during Release and at time at which the pressure of the pressure chamber 43 is the initial pressure or more. Therefore, the drive IC 33 increases the pressure of the pressure chamber 43 and ejects the ink droplets from the ejecting nozzle 41. That is, the drive IC 33 ejects the ink droplets from the ejecting nozzle 41 by matching the timing of switching from Draw to Release, the timing of switching from Release to Push, and the timing at which the pressure of the pressure chamber 43 is the initial pressure or more. Therefore, the drive IC 33 can eject two ink droplets from the ejecting nozzle 41 during one driving event in which Draw, Release, and Push are combined. As a result, the ink jet head 21 and the ink jet printer 1 can reduce power required per drop.

In a case where the length D of the Draw period is equal to AL, at the time t2, the pressure of the pressure chamber 43 reaches a peak. Therefore, at the time t2, the pressure of the pressure chamber 43 can be easily obtained by switching from Draw to Release.

In a case where the length R of the Release period is equal to 2AL, at the time t3, the pressure of the pressure chamber 43 reaches the peak. Therefore, at the time t3, the pressure of the pressure chamber 43 can be easily obtained by switching from Release to Push.

In a case where the length P of the Push period is equal to 2AL, at the time t4, the pressure of the pressure chamber 43 and a pressure decreasing by switching from. Push to Release can be balanced. Therefore, the pressure of the pressure chamber 43 can be efficiently canceled.

Figure 9:
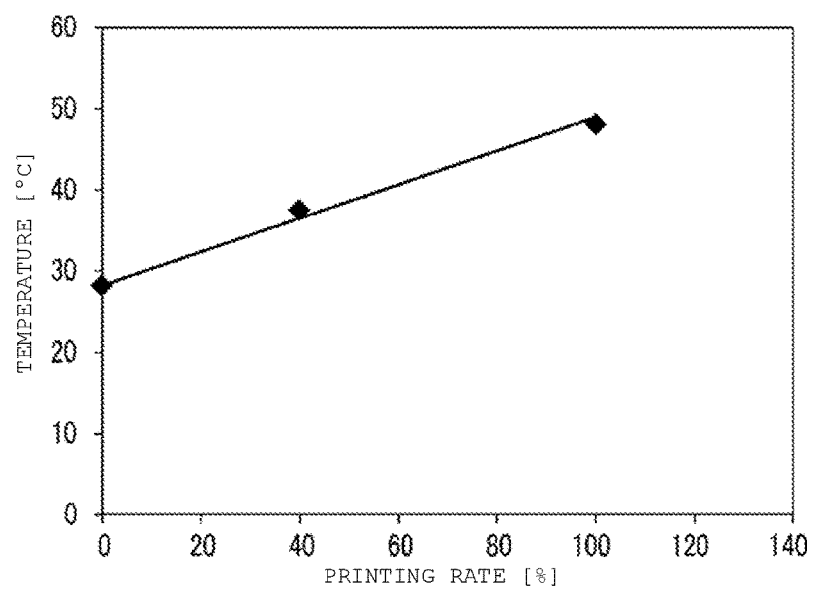
FIG. 9 depicts aspects of a change in a temperature of the drive IC.

FIG. 9 is an explanatory view for explaining a change in a temperature of the drive IC 33. The temperature of drive IC 33 increases in accordance with power for driving the actuator 40. For example, the drive IC 33 has a configuration to eject one ink droplet with one driving event and in a case where a printing rate is 100%, the temperature of the drive IC 33 increases to about 65° C. However, the drive IC 33 has a configuration to eject two ink droplets with one driving event and in a case where a printing rate is 100%, the temperature of the drive IC 33 can be kept to about 48° C. illustrated in FIG. 9. Therefore, the inkjet head 21 and the inkjet printer 1 can prevent an excessive increase in the temperature.

In the example embodiment described herein, at time t2 switching from Draw to Release, the time t3 switching from Release to Push, and the time t4 switching from Push to Release, the length D of Draw, the length R of Release, and the length P of Push are respectively set so that the pressure of the pressure chamber 43 is the initial pressure or more, but the configuration is not limited to the example embodiment described herein. At time t2 switching from Draw to Release, the time t3 switching from Release to Push, and the time t4 switching from Push to Release, the length D of Draw, the length R of Release, and the length P of Push may be respectively set so that the pressure of the pressure chamber 43 is a predetermined value or more which is set in advance. The predetermined value at the time t2 is a value which is a value or more obtained by subtracting a pressure increased by switching from Draw to Release from the ejection threshold. The predetermined value at the time t3 is a value which is a value or more obtained by subtracting a pressure increased by switching from Release to Push from the ejection threshold. The predetermined value at the time t4 is a pressure decreased by switching Push to Release and corresponds to a value of the initial pressure or more.

While certain embodiments have been described, these embodiments have been presented by way of example only, and are not intended to limit the scope of the inventions. Indeed, the novel embodiments described herein may be embodied in a variety of other forms. Furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An ink jet head, comprising:
   a nozzle plate including a nozzle fluidly connected to a pressure chamber;
   an actuator associated with the pressure chamber and configured to cause an ink to be discharged from the pressure chamber via the nozzle; and
   a drive circuit configured to supply to the actuator in a droplet ejection process:
     an expansion signal that expands the pressure chamber to an expanded state from an initial state,
     a release signal that returns the pressure chamber to the initial state from the expanded state, and
     a contraction signal that contracts the pressure chamber to a contracted state from the initial state, wherein
   the expansion signal has a first pulse width equal to a natural vibration cycle of the ink in the pressure chamber,
   the release signal has a second pulse width longer than the natural vibration cycle and shorter than three times the natural vibration cycle, and
   the contraction signal has a third pulse width longer than the natural vibration cycle and shorter than three times the natural vibration cycle.

2. The ink jet head according to claim 1, wherein the second pulse width is equal to two times the natural vibration cycle.

3. The ink jet head according to claim 1, wherein the third pulse width is equal to two times the natural vibration cycle.

4. The ink jet head according to claim 1, wherein the drive circuit is configured to:
   contract the pressure chamber from the expanded state to the initial state when a pressure of the pressure chamber exceeds a pressure of the pressure chamber in the initial state after the pressure chamber has been expanded from the initial state to the expanded state, and
   contract the pressure chamber from the initial state to the contracted state when the pressure of the pressure chamber exceeds the pressure of the pressure chamber in the initial state after the pressure chamber has been contracted from the expanded state to the initial state.

5. The ink jet head according to claim 1, wherein
   a first droplet is ejected from the nozzle coincident with the release signal in the droplet ejection process, and
   a second droplet is ejected from the nozzle coincident with the contraction signal in the droplet ejection process.

6. The ink jet head according to claim 1, further comprising:
a head substrate on which the drive circuit and the actuator are mounted, wherein
the head substrate is a rigid substrate or a flexible substrate.

7. The ink jet head according to claim 6, wherein the actuator comprises a pair of electrodes connected to the drive circuit.

8. An ink jet printer, comprising:
a conveyance motor to convey a print medium along a conveyance path;
a nozzle plate including a nozzle fluidly connected to a pressure chamber;
an actuator associated with the pressure chamber and configured to cause an ink to be discharged from the pressure chamber via the nozzle onto the print medium; and
a drive circuit configured to supply to the actuator in a droplet ejection process:
an expansion signal that expands the pressure chamber to an expanded state from an initial state,
a release signal that returns the pressure chamber to the initial state from the expanded state, and
a contraction signal that contracts the pressure chamber to a contracted state from the initial state, wherein
the expansion signal has a first pulse width equal to a natural vibration cycle of the ink in the pressure chamber,
the release signal has a second pulse width longer than the natural vibration cycle and shorter than three times the natural vibration cycle, and
the contraction signal has a third pulse width longer than the natural vibration cycle and shorter than three times the natural vibration cycle.

9. The ink jet printer according to claim 8, wherein the second pulse width is equal to two times the natural vibration cycle.

10. The ink jet printer according to claim 8, wherein the third pulse width is equal to two times the natural vibration cycle.

11. The ink jet printer according to claim 8, wherein the drive circuit is configured to:
contract the pressure chamber from the expanded state to the initial state when a pressure of the pressure chamber exceeds a pressure of the pressure chamber in the initial state after the pressure chamber has been expanded from the initial state to the expanded state, and
contract the pressure chamber from the initial state to the contracted state when the pressure of the pressure chamber exceeds the pressure of the pressure chamber in the initial state after the pressure chamber has been contracted from the expanded state to the initial state.

12. The ink jet printer according to claim 8, wherein
a first droplet is ejected from the nozzle coincident with the release signal in the droplet ejection process, and
a second droplet is ejected from the nozzle coincident with the contraction signal in the droplet ejection process.

13. The ink jet printer according to claim 8, further comprising:
a head substrate on which the drive circuit and the actuator are mounted, wherein
the head substrate is a rigid substrate or a flexible substrate.

14. The inkjet printer according to claim 13, wherein the actuator comprises a pair of electrodes connected to the drive circuit.

15. An ink jet head, comprising:
a first piezoelectric plate attached to an upper surface of a substrate;
a second piezoelectric plate attached to an upper surface of the first piezoelectric plate, the first and second piezoelectric plates having polarizations opposite to each other along a direction parallel to thicknesses of the first and second piezoelectric plates;
a pressure chamber comprising:
a groove cut from an upper surface of the second piezoelectric plate toward a bottom surface of the first piezoelectric plate, shielded by a top plate at the upper surface of the second piezoelectric plate and by an orifice plate at a front edge of the groove;
a pair of electrodes on inner walls of the groove; and
a nozzle in the orifice plate at the front edge of the groove;
a waveform generation circuit that generates an expansion signal, a release signal, and a contraction signal in sequence in a droplet ejection process; and
a drive circuit configured to receive the expansion signal, the release signal, and the contraction signal and drive the pressure chamber via the pair of electrodes to eject ink from the nozzle, wherein
the expansion signal expands the pressure chamber to an expanded state from an initial state, the expansion signal having a first pulse width equal to a natural vibration cycle determined by the pressure chamber and the ink,
the release signal returns the pressure chamber to the initial state from the expanded state, the release signal having a second pulse width longer than the natural vibration cycle and shorter than three times the natural vibration cycle, and
the contraction signal contracts the pressure chamber to a contracted state from the initial state, the contraction signal having a third pulse width longer than the natural vibration cycle and shorter than three times the natural vibration cycle.

16. The ink jet head according to claim 15, wherein the second pulse width is equal to two times the natural vibration cycle.

17. The ink jet head according to claim 15, wherein the third pulse width is equal to two times the natural vibration cycle.

18. The ink jet head according to claim 15, wherein the drive circuit is configured to:
contract the pressure chamber from the expanded state to the initial state when a pressure of the pressure chamber exceeds a pressure of the pressure chamber in the initial state after the pressure chamber has been expanded from the initial state to the expanded state, and
contract the pressure chamber from the initial state to the contracted state when the pressure of the pressure chamber exceeds the pressure of the pressure chamber in the initial state after the pressure chamber has been contracted from the expanded state to the initial state.

19. The ink jet head according to claim 15, wherein
a first droplet is ejected from the nozzle coincident with the release signal in the droplet ejection process, and
a second droplet is ejected from the nozzle coincident with the contraction signal in the droplet ejection process.

20. The ink jet head according to claim 15, wherein the substrate is a rigid substrate or a flexible substrate.

* * * * *